Patented Apr. 27, 1954

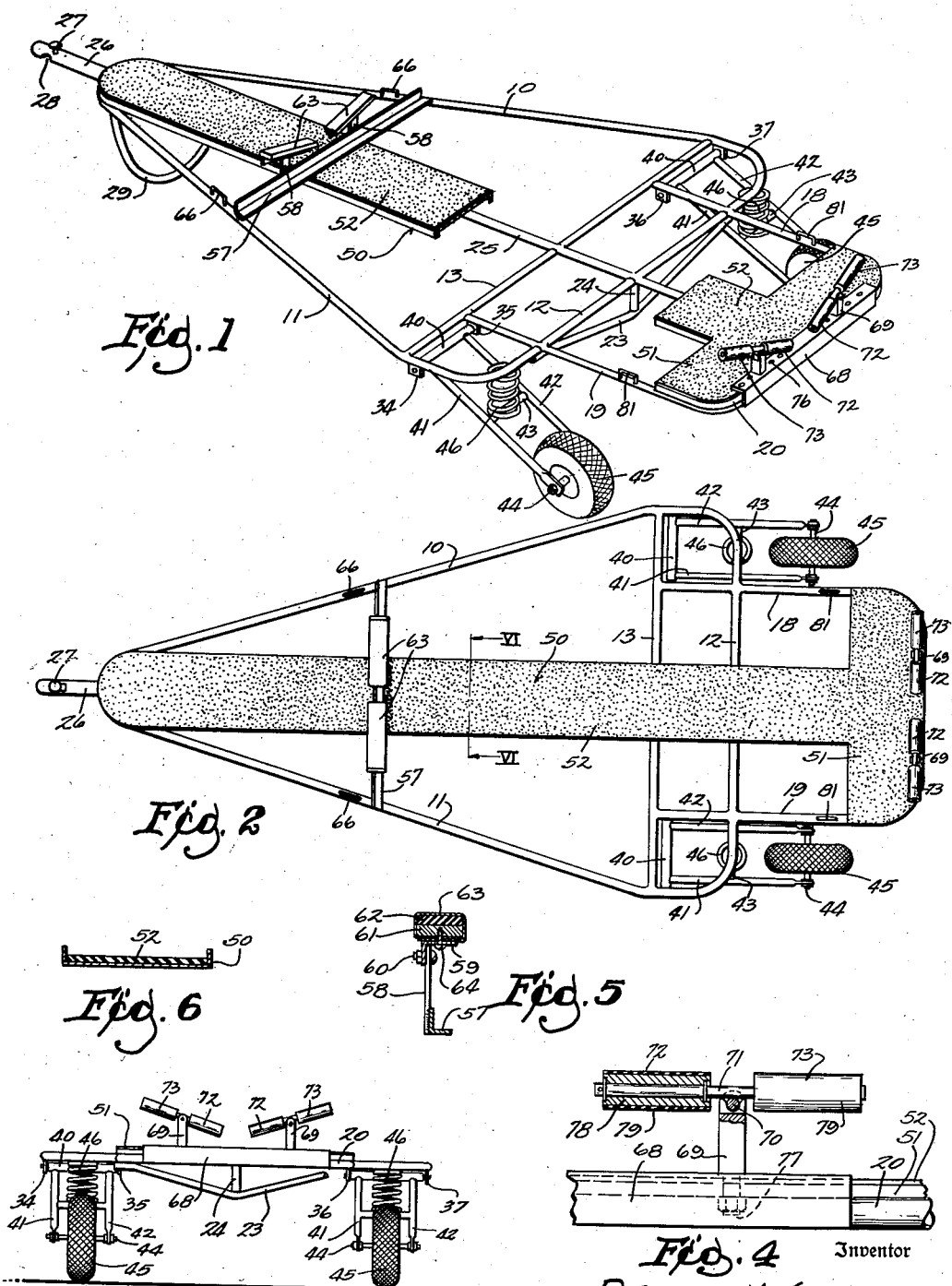

2,676,716

UNITED STATES PATENT OFFICE 2,676,716

BOAT TRAILER

Daniel V. Sallis, West Allis, Wis.

Application July 3, 1950, Serial No. 171,842

4 Claims. (Cl. 214—84)

This invention relates to improvements in trailers for hauling and handling a boat.

It is one object of the present invention to provide a trailer of light and simple construction but sufficiently rigid and rugged for hauling a boat with safety and at high speeds over highways and for handling the boat over rough terrain or marshy ground.

Another object is to provide a trailer for hauling and handling a boat and which will have a minimum of undercarriage structure, all within the maximum width of the trailer frame and so arranged as to minimize resistance to movement of the trailer and boat over rough ground and through brush, high grass and the like.

Another object of the invention is to provide a trailer for handling a boat and from which the boat can be readily launched into water and can be readily reloaded either from the water or from land, by one person and without damage to the boat.

A further object of the invention is to provide a boat hauling and handling trailer with a walkway on the frame for maneuvering the boat both longitudinally and transversely of the trailer into the desired position for reloading on the trailer from the water, the frame and walkway being severally of minimum weight but so related as to coact in resisting stresses on the trailer during hauling and handling of the boat.

And a further object of the invention is to provide a boat hauling and handling trailer with a tubular frame having a minimum of braces so related as to cooperate in resisting road shocks transmitted to the frame from wheels individually mounted and sprung on braced parts of the frame whereby the hauling stresses on the loaded trailer are first transmitted to the braced frame portions.

Objects and advantages other than those above set forth will be apparent from the following description when read in connection with the accompanying drawings in which:

Fig. 1 is a perspective view of a boat hauling and handling trailer embodying my invention, with portion of the walkway broken away.

Fig. 2 is a top plan view of the trailer.

Fig. 3 is an end view of the construction shown in Figs. 1 and 2.

Fig. 4 is a side view, partially in section, of one of the means for supporting a boat on the trailer.

Fig. 5 is an enlarged detailed view, partially in section, of another of the means for supporting a boat on the trailer; and Fig. 6 is a sectional view on the line VI—VI of Fig. 2 to illustrate a modified form of the walkway construction.

Generally, the present trailer comprises a frame including a substantially triangular main portion and a U-shaped auxiliary portion extending from one end of the main frame portion. The main frame portion has only one longitudinal brace and two transverse braces, the transverse braces being respectively inside the perimeter of the main frame portion and being a truss-like structure below and attached to the one side of the main frame portion. The auxiliary frame is of less width than the main frame and is so joined with the main frame as to define relatively small rectangular frame portions where the individual wheel mounts are pivotally attached to the frame. Springs act between the wheel mounts and the frame at the ends of the truss brace so that the free ends of the wheel mounts and the wheels secured therein may severally move into the spaces defined by the base end of the main frame and the sides of the auxiliary frame, when a wheel is forced upwardly toward the frame. A walkway extends longitudinally of the entire frame and transversely thereof at the projecting end of the auxiliary frame. Self-adjustable supports are mounted toward the forward end of the trailer and self-adjusting rollers are mounted at the rearward end of the trailer for conforming to the contour of the boat bottom upon placing of the boat thereon. It will be understood that either of the support structures herein disclosed may be used at either location on the trailer.

Referring to the drawings in which like reference numerals are applied to like parts, the main frame includes sides 10 and 11 of equal length and a side 12, the sides being formed as a closed triangle with rounded corners and with the side 12 forming the base of the triangle. A cross-brace 13 extends between the main frame sides 10 and 11 inside of and in spaced parallel relation to the main frame base 12 and in the plane of the sides of the main frame. A substantially U-shaped auxiliary frame comprises sides 18 and 19 and an end 20 formed as one continuous member with the ends and intermediate parts of the sides joined respectively to the main frame cross-brace 13 and the main frame base 12. The major portion of the auxiliary frame extends outwardly from the main frame base 12. The auxiliary frame is narrower than the base 12 of the main frame to coact with the several main frame members in defining relatively small and substantially rectangular spaces inside of the main frame sides and base and substantially rectangular spaces outside of the main frame if the frame sides were extended to the line of the auxiliary frame end.

A truss-like brace is formed with a member 23 joined at the ends to the juncture of the main frame base 12 with intermediate points of the auxiliary frame sides 18, 19 and such brace extends at a right angle to the main and auxiliary frames. The truss brace also includes a member 24 extending between the main frame base 12 and the truss member 23. A brace 25 extends from outside of the apex of the triangular main frame portion and on the altitude of such triangular frame portion and to the end of the auxiliary frame, such brace being joined on its crossing or intersection points with the adjacent members of the main and auxiliary frames.

The projecting end 26 of the longitudinal brace 25 is provided with suitable means for attachment to a vehicle such as the ball 27 of a well-known form of trailer hitch, and an aperture 28 for the attachment of a safety chain or other safety means usually required when such trailers are used on highways. An arcuate member 29 is joined with the longitudinal brace 25 and extends therefrom in a vertical plane substantially on the axis of such brace and in the direction as the truss 23, 24 to form a skid for the apex or forward end of the trailer. All of the above parts are made of tubing and the joints between parts are welded without gusset plates or other corner braces.

Pairs of ears 34, 35 and 36, 37 are fixed on the main frame to extend from adjacent the main frame and auxiliary frame sides in the same direction as the truss 23, 24 and the skid 29. Wheel frames or mounts severally comprising an end piece 40, side pieces 41, 42 and a brace 43, are pivotally mounted at the end pieces 40, between a pair of ears and extend from the frame at an angle and in the same direction as the truss 23, 24 and the skid 29. Each wheel mount has an axle 44 mounted between the side pieces 41, 42 and at the free end thereof for rotatably receiving a pneumatic tired wheel 45 having anti-friction bearings suitably sealed to exclude dust and water and provided with means for lubricating the same under pressure as is well known.

Compression springs 46 severally act between the main frame base 12 adjacent the ends of the truss 23, and the wheel mount braces 43 to cushion road shocks transmitted from the wheels to the frame. It will be observed that the wheel mounts are placed at a location in the frame where the frame members are so related as to provide a structure sufficiently rigid to withstand the stresses developed by road shocks and other forces acting upon the trailer during the hauling and handling of a boat thereon.

A walkway is mounted on the main and auxiliary frames and comprises a longitudinal section 50 extending the length of the main frame and over a portion of the auxiliary frame and a transverse section 51 extending the width of the auxiliary frame and at the end thereof projecting from the main frame. Such walkway is preferably a flanged plate of light metal or light metals alloy and has fixed thereon a cover 52 which is not affected by immersion in water and which has a good co-efficient of friction for either bare or shod feet of persons using the trailer and when either dry or wet. A transversely ribbed elastomeric material has been found especially suitable for the cover. It will be noted that the relationship of the walkway to the frame is such as to provide not only for transverse movement of a person on the trailer during maneuvering of the boat into position for reloading the boat while still in the water and to draw the boat on the trailer from the water, but is also such as to aid the frame in resisting stresses developed during the use of the trailer. The walkway flanges may be turned as shown in Fig. 6 to form a guard for the edges of the cover 52 and an indication of the edges of the walkway to any person using the trailer as will be described.

A cross-piece 57, which may be of the cross-sectional shape known as an angle, is fixed to the main frame sides 10 and 11 and extends over the walkway section 50 and toward the apex end of the trianglar main frame. The cross-piece 57 has mounted thereon pads or supports for the boat bottom. The pads or supports are at an angle to the plane of the walkway and severally consist of an upright 58 pivotally connected with a bar 59 as by a bolt 60. A block of wood 61 has mounted thereon a cushion 62 of resilient material and both the block and the cushion are preferably enclosed in cover 63. The cushioned pad is fixed on the support 58—60 by screws 64 through the support bar into the block. The support bar and pad may be set or may pivot to any desired angle relative to the frame of the walkway so that the angle defined between such supports may conform with the portion of the bottom surface of the boat coming to that point when the boat is loaded on the trailer. Strap loops 66 are fixed to the main frame sides 10, 11 to provide means for holding the boat on the pads or supports 58—64.

At the extending end of the auxiliary frame 18—29, are mounted a pair of rollers which are preferably supported on an angle bar 68 extending substantially the full width of the auxiliary frame. Each of the roller mounting and roller units consists of a U-shaped bracket 69 in which is pivotally mounted a bar 70 to which is fixed an axle 71 having rollers 72, 73 rotatable thereon. The bar 68 is preferably provided with a number of holes 76 by which the brackets 69 may be spaced as desired from the center line of the trailer by shifting the bolts 77 holding such brackets to the bar. The rollers are preferably formed with a solid body 78 providing a surface for bearing on the axle 71 and with a sheath 79 of resilient material. The rollers therefore automatically position themsevlves to provide adequate support for the boat bottom as the boat is being drawn on the trailer and when the boat is completely on the trailer. Strap loops 81 are fixed on the auxiliary frame sides for fastening the boat securely on the trailer.

In use, the bolts 60 of supports 58—64 are preferably released and the rollers 72, 73 are adjusted to a spacing clearing any keel projection of the boat to be handled. When the boat is to be loaded from land, the bow of the boat is lifted to rest on rollers 72, 73 and to extend over the walkway. Any person capable of lifting the bow of a boat as indicated can then pull the boat on the trailer from the walkway. As the boat is pulled on the trailer, rollers 72, 73 rotate and pivot to conform to the contour of the boat bottom as the boat is pulled on the trailer. When the boat is in place on the trailer, the bolts 60 of the forward supports are tightened and can be left in that condition until a different boat is to be handled on the trailer.

If the boat is to be launched or reloaded from the water by a person incapable of lifting approximately one-half of the boat weight, the trailer is pushed into the water so that the walkway is just above the surface of the water. The boat can then be pushed to bring the stern into the water which will buoy a portion of the weight so that the bow of the boat can be lifted and carried over the walkway portion between the two sets of supports.

When the boat is to be reloaded from the water by a small or weak person, the bow of the boat is guided between the rollers 72, 73 and the boat is floated forward until the boat bottom rests on the walkway. The bow portion of the boat is then lifted and the boat is drawn further forward to bring the boat in desired position relative to the supports 58—64 and the rollers 72—73. During the forward drawing of the boat, a considerable portion of the boat weight is supported by the water until the stern portion of the boat rides on the rollers 72, 73 which pivot and rotate simultaneously to support the boat. The trailer and the boat can then be drawn from the water and the boat is secured to the loops 66, 81.

The trailer may remain in partially submerged position and will then serve as a pier or for "beaching" the boat where the shoreline is not suitable for such purposes.

It will be understood that the degree to which the trailer is submerged in either the reloading or launching operations depends on the weight of the boat and the person doing the reloading or launching. In use of the present trailer, it has been found that one person can readily load and launch any boat of which the bow end can be placed as desired by such person.

Further, it has been found that the trailer and boat can be hauled on even rough highways at speeds up to sixty-five miles per hour without objectionable bouncing of the trailer and the boat and with no appreciable side-sway thereof. When portaging of boats is frequently required, boats of greater weight can be handled than could be carried by a number of persons and the rough terrain usually found at such portages is no deterrent to the use of the trailer. It has been found that the trailer is particularly useful where the boat and trailer must be moved between trees, through brush or high grass or the like and over rough or marshy ground.

It will thus be seen that the present construction provides an extremely light and simple but rigid construction with the braces placed at the precise locations where any considerable stresses may be developed, thus making the maximum use of the material employed in the construction. The trailer has the minimum under-carriage of simple design so that the loaded trailer can be readily handled on rough ground, in brush, etc. and so that brush will not catch in such under-carriage.

All of the under-carriage is within the maximum width of the trailer frame, the wheels being in spaces substantially defined by the base of the main frame and the sides of the auxiliary frame so that there are no small and relatively unnoticed projections which might catch on trees or the like when the trailer is handled. The walkway provides space for all the movements required of a person launching the boat or loading the boat. The walkway is kept to minimum size consistent with maneuverability of the boat for launching or reloading but stiffens the frame both longitudinally and transversely where the launching and reloading stresses may develop. The self-adjusting boat supports particularly at the rear end of the trailer, considerably facilitate the launching and reloading of a boat by a single person.

I claim:

1. In a trailer for hauling and handling a boat, a main frame of substantially triangular shape and including a longitudinal brace on the altitude and a transverse brace within and substantially parallel with the base of the triangle and an auxiliary frame of U-shape having the sides thereof joined with the main frame transverse brace and the main frame base for defining substantially rectangular frame portions adjacent the base of the main frame, a pair of wheels severally and pivotally attached to the main frame at one side of the substantially rectangular portions thereof, and pairs of supports mounted on the frame intermediate the ends and at one end of the frame, the pairs of supports severally defining an angle and being individually pivoted and self adjustable to conform to the contour of the boat bottom.

2. In a trailer for hauling and handling a boat, a tubing frame including a main frame portion and an auxiliary frame extending from one end of the main frame portion, a substantially unobstructed walkway extending over and centrally and longitudinally of the main frame portion and tranversely of the auxiliary frame portion at the end thereof extending from the main frame and constituting longitudinal and transverse bracing means therefor, a pair of wheels severally and pivotally attached to the frame transversely thereof between the ends of and within the sides of the frame, and pairs of supports for the boat, the supports being mounted on the frame intermediate the ends and at one end of the frame and being severally pivoted for self-adjustment to conform with the contour of the boat bottom.

3. In a trailer for hauling and handling a boat, a tubing frame of substantially triangular outline in one plane, a substantially unobstructed walkway extending longitudinally of and over the frame from end to end thereof and transversely of the rear portion thereof and constituting longitudinal and transverse bracing means therefor, wheel mounts formed of tubing severally and pivotally attached at one end to the frame, wheels severally and rotatably secured in the wheel mounts, a depending truss-like brace formed of tubing and extending transversely beneath lateral portions of the frame and forming therewith a substantially triangular bracing member, and compression springs seated directly on and acting between the wheel mounts and the frame and at the ends of the truss brace whereby the brace resists the tendency of spring reaction forces to twist the frame.

4. In a trailer for hauling and handling a boat, a tubing frame in substantially one plane and including a main frame portion and an auxiliary frame portion extending from the main frame portion, a walkway extending centrally and longitudinally of the frame from end to end thereof and thereon and transversely from side to side of the auxiliary frame portion and at one end thereof, the upper surface of the walkway being free from obstructions and the longitudinal portion of the walkway having flanged edges extending upwardly from the upper surface thereof, the main and auxiliary frames defining spaces within the main frame side members if extended, a pair of wheels severally and pivotally attached to the frame between the ends thereof and within the frame spaces, a skid extending from the major plane of the frame and substantially on the center line of the frame, a pair of self-adjustable supports mounted between the ends of the main frame portion and toward one end thereof, and a pair of pivoted multiple rollers mounted at one end of the auxiliary frame, the rollers being severally self-adjusting to conform with the contour of the boat bottom.

References Cited in the file of this patent

UNITED STATES PATENTS

| Number | Name | Date |
|---|---|---|
| 1,374,379 | Klein | Apr. 12, 1921 |
| 2,086,160 | Gotthardt et al. | July 6, 1937 |
| 2,361,951 | Livermon | Nov. 7, 1944 |
| 2,389,338 | Zorc, Jr. | Nov. 20, 1945 |
| 2,425,252 | Larson | Aug. 5, 1947 |
| 2,442,248 | Sampsell | May 25, 1948 |
| 2,448,443 | Krake | Aug. 31, 1948 |
| 2,496,599 | Rivers | Feb. 7, 1950 |
| 2,506,699 | Byrd | May 9, 1950 |
| 2,525,506 | Wiedman | Oct. 10, 1950 |
| 2,558,418 | Brueckman | June 26, 1951 |
| 2,571,213 | Cunningham et al. | Oct. 16, 1951 |
| 2,586,485 | Schroeder | Feb. 19, 1952 |
| 2,608,314 | Krider | Aug. 26, 1952 |